United States Patent [19]

Leslie et al.

[11] Patent Number: 6,070,460

[45] Date of Patent: *Jun. 6, 2000

[54] APPARATUS AND METHOD FOR DETERMINING WIND PROFILES AND FOR PREDICTING CLEAR AIR TURBULENCE

[75] Inventors: Kenrick Roford Leslie, Inglewood, Calif.; Michael Lee Shand, Morristown, N.J.; Martin Carlin Baker, Budd Lake, N.J.; Joseph J. Barrett, Morris Plains, N.J.; Clint Patrick Kilroy, Parsippany, N.J.

[73] Assignee: AlliedSignal Inc., Morristown, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/808,589

[22] Filed: Feb. 28, 1997

Related U.S. Application Data

[60] Provisional application No. 60/013,312, Mar. 8, 1996.

[51] Int. Cl.[7] ........................................................ G01F 1/68

[52] U.S. Cl. ........................................ 73/170.07; 73/178 R

[58] Field of Search .............................. 73/170.02, 170.07, 73/170.08, 170.11, 170.12

[56] References Cited

U.S. PATENT DOCUMENTS

| | | | |
|---|---|---|---|
| 3,359,557 | 12/1967 | Fow et al. | 343/100 |
| 3,404,396 | 10/1968 | Buehler et al. | 343/5 |
| 3,427,581 | 2/1969 | Hartman et al. | 340/25 |
| 3,448,613 | 6/1969 | Stanton et al. | 73/170 |
| 3,465,339 | 9/1969 | Marner | 343/100 |
| 3,491,358 | 1/1970 | Hicks | 343/5 |
| 3,540,829 | 11/1970 | Collinson et al. | 356/129 |
| 3,567,915 | 3/1971 | Altshuler et al. | 235/151.3 |
| 3,599,488 | 8/1971 | Mather et al. | 73/178 |
| 3,641,345 | 2/1972 | Coackley et al. | 250/83.3 H |
| 3,646,555 | 2/1972 | Atlas | 343/5 W |
| 3,665,467 | 5/1972 | Haroules et al. | 343/100 ME |
| 3,696,670 | 10/1972 | Collis | 73/170 R |
| 3,715,748 | 2/1973 | Hicks | 343/5 W |
| 3,722,272 | 3/1973 | McPherson | 73/178 R |
| 3,780,293 | 12/1973 | Flint | 250/339 |
| 3,803,601 | 4/1974 | Serafin | 343/5 W |
| 3,856,402 | 12/1974 | Low et al. | 356/5 |
| 3,935,460 | 1/1976 | Flint | 250/349 |
| 4,031,756 | 6/1977 | Rotier et al. | 73/170.02 |
| 4,195,931 | 4/1980 | Hara | 356/346 |
| 4,266,130 | 5/1981 | Kuhn . | |
| 4,303,862 | 12/1981 | Geiger | 250/372 |
| 4,342,912 | 8/1982 | Adamson | 250/339 |
| 4,346,595 | 8/1982 | Frosch . | |
| 4,359,640 | 11/1982 | Geiger | 250/372 |
| 4,427,306 | 1/1984 | Adamson . | |

(List continued on next page.)

FOREIGN PATENT DOCUMENTS

| | | |
|---|---|---|
| 0 488 004 | 6/1992 | European Pat. Off. . |
| 1288104 | 9/1972 | United Kingdom . |

OTHER PUBLICATIONS

Bender et al, Journal of Applied Meterology, vol. 15, Nov. 1996 Temperature Gradients and Clear–Air Turbulence Probabilities–pp. 1193–1199.

Tandon et al.; Journal of Materials Science Letters 12; 1993; pp. 1182–1184.

*Primary Examiner*—Max Noori
*Attorney, Agent, or Firm*—Lori B. Yeadon

[57] ABSTRACT

The invention provides a system for passive measurement of atmospheric temperature using a passive direction detector for detecting the energy of a narrow wavelength band emanating from a volume of atmospheric gas. The resulting signal can be associated with an effective temperature. The effective temperature can be associated with an effective range. The system generates a temperature map which can determine, at predetermined time intervals, atmospheric temperatures in an azimuth plane associated with a predefined range from the detector. The temperature map can then be used to calculate temperature gradients that in turn can be used to compute the vertical wind vector difference and to determine the presence of clear air turbulence.

57 Claims, 6 Drawing Sheets

U.S. PATENT DOCUMENTS

| | | |
|---|---|---|
| 4,474,062 | 10/1984 | Gary . |
| 4,624,796 | 11/1986 | Giniewicz ............................. 252/62.9 |
| 4,937,447 | 6/1990 | Barrett . |
| 4,944,891 | 7/1990 | Sagong ................................. 252/62.9 |
| 4,947,165 | 8/1990 | Zweifel . |
| 4,965,572 | 10/1990 | Adamson . |
| 4,965,573 | 10/1990 | Gallagher et al. . |
| 5,105,191 | 4/1992 | Keedy . |
| 5,117,689 | 6/1992 | Gary . |
| 5,130,712 | 7/1992 | Rubin et al. . |
| 5,173,704 | 12/1992 | Buehler et al. ............................ 342/26 |
| 5,218,866 | 6/1993 | Phillips et al. ....................... 73/170.12 |
| 5,262,782 | 11/1993 | Rubin et al. . |
| 5,276,326 | 1/1994 | Philpott . |
| 5,285,070 | 2/1994 | Barrett . |
| 5,311,183 | 5/1994 | Matthews et al. . |
| 5,359,888 | 11/1994 | Hagen . |
| 5,523,759 | 6/1996 | Gillberg et al. . |
| 5,534,868 | 7/1996 | Gjessing et al. ........................... 342/26 |
| 5,541,591 | 7/1996 | Bush . |
| 5,568,151 | 10/1996 | Merritt ................................. 342/192 |
| 5,592,171 | 1/1997 | Jordon ..................................... 342/26 |
| 5,602,543 | 2/1997 | Prata et al. ............................ 340/968 |
| 5,615,118 | 3/1997 | Frank ............................... 364/424.013 |
| 5,639,964 | 6/1997 | Djorup ................................ 73/170.12 |
| 5,654,700 | 8/1997 | Prata et al. ............................ 340/963 |

APPARATUS AND METHOD FOR DETERMINING WIND PROFILES AND FOR PREDICTING CLEAR AIR TURBULENCE

CROSS REFERENCE TO RELATED APPLICATION

This application claims the benefit of U.S. Provisional Application No. 60/013,312 filed on Mar. 8, 1996.

FIELD OF THE INVENTION

The present invention relates generally to an aircraft flight management system, and, an aircraft flight safety system. An apparatus incorporating a passive detector is used for mapping temperature, for detecting the difference in the speed and direction of winds at various altitudes and for predicting clear air turbulence conditions ahead of the aircraft.

BACKGROUND OF THE INVENTION

Knowledge of wind speed and direction at various altitudes is valuable to aircraft pilots for numerous reasons. Two reasons include fuel consumption and safety. At cruising altitude an aircraft's fuel consumption could be reduced if the pilot was aware of and took advantage of more favorable wind patterns, such as a lower head wind or a higher tail wind. On long haul flights, the selection of favorable winds would result in significant cost savings to the airline.

However, currently there are no effective methods or apparatus for passive profiling atmospheric winds ahead of an aircraft during flight. Active systems using Doppler LIDAR are expensive and have limited range. One method for determining fuel-efficient aircraft altitudes is described in Gary, U.S. Pat. No. 4,474,062. This concept is based on determining the air density at altitudes in the vicinity of the aircraft's present altitude by use of a microwave radiometer to detect the thermal emission from oxygen to indicate the air temperature at a particular altitude. The temperature is then used to determine the air density at that altitude. Since the weight of the aircraft is known during the flight as the fuel is consumed, it is possible to calculate the aircraft weight-to-air density ratio, W/d. This ratio has an optimum value (depending on the type of aircraft) for which the fuel consumption is minimum. The pilot then has the option to change altitude to achieve a more favorable W/d ratio. This method for determining fuel efficient aircraft altitudes is inadequate since it is based only on the determination of the aircraft weight to air density ratio and doesn't take into account the wind speed and direction at the altitude that has the optimum value of W/d. As a result, it may be determined, for example, that the optimum W/d ratio is at an altitude 4000 ft above the present aircraft altitude. If the pilot increases his altitude by 4000 ft and then finds a significant increase in the head winds, this situation could completely negate any fuel efficiency savings due to having a more optimum W/d ratio.

In Gary, U.S. Pat. No. 4,346,595, it is asserted that by knowing the altitude of the local tropopause, it is possible to find efficient flight altitudes by flying about 2000 ft above the tropopause when traveling in a westerly direction and about 2000 ft below the tropopause when going in an easterly direction. The tropopause is generally a broad transitional zone between the troposphere and the stratosphere. From an operational standpoint, it is not practical to use the tropopause as a reference from which to make altitude changes. In addition, the system described in Gary does not take into account local variation in winds that may be present at the new altitudes.

Clear air turbulence (CAT) is a major safety concern for large commercial aircraft. CAT is a weather phenomenon that is due to vertical wind shear in the atmosphere. It usually occurs in temperature inversion layers typically found in the tropopause. CAT results in a rapidly changing airflow over the lift surfaces of the aircraft. Should the forward velocity of the air over the lift surfaces suddenly decrease, the lift will decrease. In this situation, the aircraft may experience a forced descent due to the down flowing air mass and also by an apparent loss in forward air speed. It is thus desirable that an onboard weather system be capable of providing an advanced warning of such wind conditions.

Since the conditions that result in clear air turbulence are not visually apparent nor are they generally detectable by active sensors such as radar, there have been a number of attempts to detect wind shear and clear air turbulence conditions by passive detectors. In particular, attempts have been made to sense air temperature gradients, which are associated with air turbulence, by detecting the radiation emanating from the atmosphere ahead of the aircraft in the infrared and microwave spectral regions. The intensity of the detected radiation varies with the atmospheric temperatures along the line of sight of the detector. Typically these passive systems use a radiometer to measure the thermal radiation from one of the atmospheric gases such as carbon dioxide ($CO_2$), oxygen ($O_2$) or water vapor ($H_2O$) to determine changes in the spatial temperature profile in front of the aircraft. Examples of such approaches based on the infrared emission of $CO_2$ are provided in U.S. Pat. Nos. 3,475,963, 3,735,136, 3,780,293, 3,935,460, 4,266,130, 4,427,306, 4,937,447, 4,965,572, 4,965,573, 5,105,191, 5,276,326 and 5,285,070. Other approaches determine atmospheric temperature by measuring the microwave emission from $O_2$ as described in U.S. Pat. Nos. 3,359,557, 3,380,055, 4,346,595, and 5,117,689. Systems for measuring atmospheric temperature based on infrared emission from $H_2O$ are described in U.S. Pat. No. 4,266.130 and in the paper by Kuhn et al, "Clear Air Turbulence: Detection by Infrared Observations of Water Vapor" in *Science*, Vol. 196, p.1099, (1977). In addition, there have been several papers written describing these types of passive infrared systems including: S. M. Norman and N. H. Macoy, "Remote Detection of Clear Air Turbulence by Means of an Airborne Infrared System" AJAA Paper No. 65–459 presented at the AIAA Second Annual Meeting, San Francisco, Calif., Jul. 26–29, 1965; and R. W. Astheimer, "The Remote Detection of Clear Air Turbulence by Infrared Radiation" in *Applied Optics* Vol. 9, No. 8, p.1789 (1970). In U.S. Pat. No. 4,346,595, Gary describes a microwave radiometer for determining air temperatures in the atmosphere at ranges of about 3 km from the aircraft for the purpose of detecting the height of the tropopause and the presence of temperature inversions. He teaches that by flying the aircraft above or below the tropopause or temperature inversion layer, it is possible to avoid CAT. Since the effective range of the microwave radiometer is relatively short, the system doesn't provide sufficient warning time for the aircraft to avoid the CAT condition. The present invention has detection ranges on the order of 100 km which will allow time for the aircraft to change altitude to avoid CAT.

A number of the above systems were not successful or were only partially successful because they were based solely on the measurement of atmospheric temperature in order to predict the presence of turbulence. A more reliable indication of atmospheric turbulence can be realized by determining the Richardson number, Ri. The use of the Richardson number to determine the stability of the atmosphere is well known in meteorology (see, for example, D. Djuric, *Weather Analysis*, Prentice Hall, Englewood Cliffs, N.J., 1994, p.64). In the present invention, the Richardson number is used to indicate the probability of CAT. In U.S. Pat. No. 5,117,689, Gary discussed the correlation of the reciprocal of the Richardson number with the occurrence of CAT conditions. The Richardson number, Ri, contains two components: (1) the vertical lapse rate of potential temperature and (2) the wind shear which is related to the horizontal temperature gradient. A number of the prior art discussions measure the vertical temperature lapse rate. Gary used the inertial navigation system (INS) to measure the East-West and North-South components of the wind (the wind shear) along with a microwave radiometer to measure the air temperature vertical lapse rate. This information is then used to calculate the Richardson number or its reciprocal. The deficiency of the system described in this patent (U S. Pat. No. 5,117,689) is that it determines the Richardson number at relatively close ranges (less than 3 km) and therefore does not provide advance warning of the CAT condition and that it measures the wind shear only at the aircraft.

Previous approaches for the determination of the range and probability of CAT can be summarized as follows:

U.S. Pat. No. 5,276,326 to Philpott determines turbulence as a function of temperature vs. range through the analysis of infrared radiometer signals at two or more discrete wavelengths. The temperature associated with a given range as a function of wavelength is then derived through a matrix inversion process. This transition is difficult and requires noise and error free input data to yield valid results. The present invention overcomes this difficulty by using only one wavelength. Gary overcomes the multiple wavelength difficulty in U.S. Pat. No. 4,346,595 by measuring effective temperature and range at a single wavelength, however no attempt is made to determine the probability of clear air turbulence using the Richardson number (Ri). In U.S. Pat. No. 5,117,689, Gary teaches the significance of the Richardson number in CAT prediction but does not suggest a method to derive Ri directly from radiometric measurements of horizontal and vertical temperature lapse rates obtained by combining azimuth and elevation scanning with the aircraft motion to produce a temperature map.

SUMMARY OF THE INVENTION

It is therefore an object of the invention to provide a method and apparatus for determining both fuel efficient aircraft altitudes and for predicting clear air turbulence. The invention provides a system for passive measurement of atmospheric temperature using a detector for detecting the energy of a narrow wavelength band emanating from a volume of atmospheric gas. The resulting signal can be associated with an effective temperature. The effective temperature can be associated with an effective range.

It is an additional object of the invention to provide a system utilizing a radiometer to detect the radiation of a predetermined wavelength band of $CO_2$ associated with an effective range that corresponds to the wavelength band in order to measure the temperature of the atmosphere in a predetermined direction and associated with the effective range from the radiometer. A range of suitable wavelengths is 12.2 to 13 $\mu$m where the effective range is 90 to 120 km at an altitude of 35,000 ft.

Another object of the invention is to provide a system for generating a temperature map using a passive directional detector which can determine, at predetermined time intervals, atmospheric temperatures in an azimuth plane associated with a predefined range from the detector. The temperature map can then be used to calculate temperature gradients that in turn can be used to compute the vertical wind vector difference and to determine the presence of clear air turbulence.

A further object of the invention is to provide an advisory system using a passive detector on board an aircraft to determine whether the winds at flight levels up to 6,000 ft. above or below the aircraft would be more favorable, either through a lower head wind or a higher tail wind, such that changing altitude would result in reduced fuel consumption. The detector can include an infrared radiometer to determine the temperature field from which the thermal wind at the upper and lower flight levels is calculated.

Yet another object of the invention is to provide an aircraft clear air turbulence warning system that uses a passive detector on board the aircraft to generate signals representing horizontal temperature gradients and vertical temperature profiles that can be used to compute the Richardson number which in turn can be used to generate a warning when the wind shear exceeds a predetermined value.

DETAILED DESCRIPTION OF THE INVENTION

Figure 1:
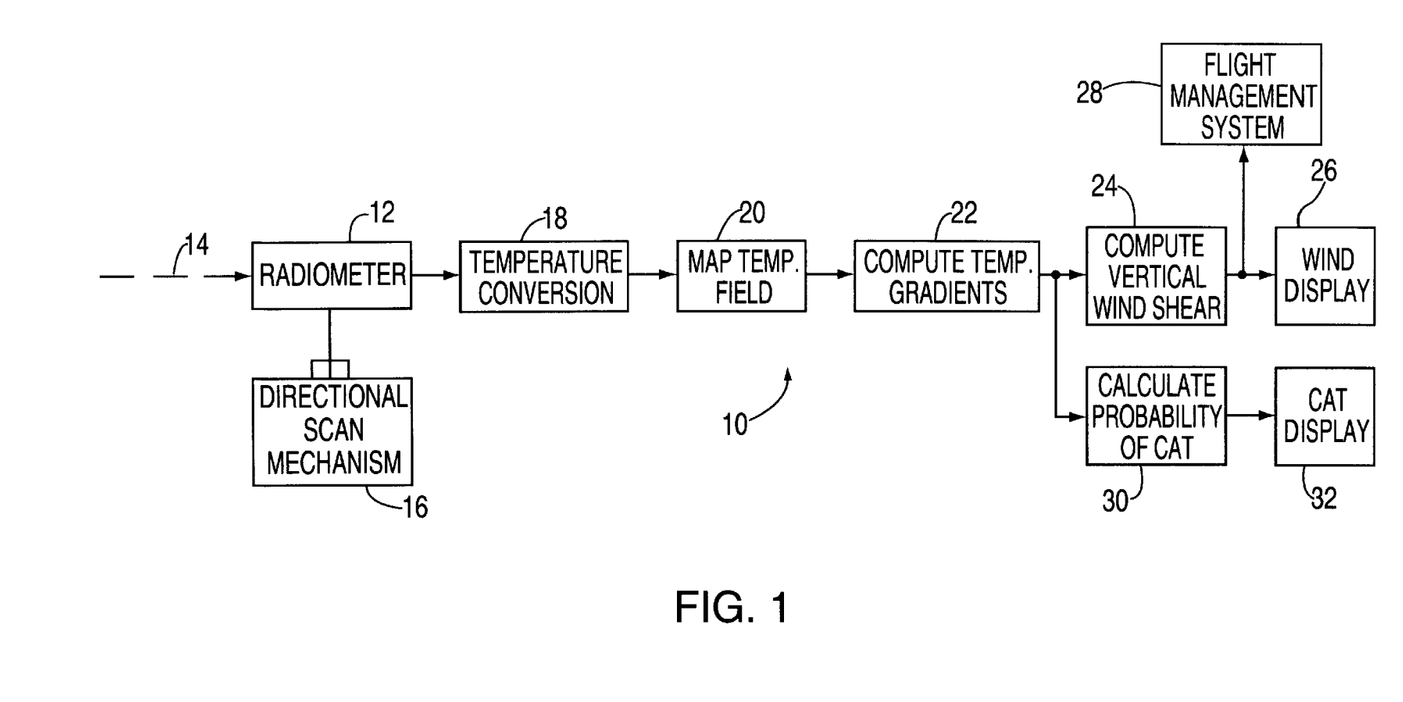
FIG. 1 is a functional block diagram of the preferred embodiment of the invention.

FIG. 1 provides an overview, in the form of a functional block diagram, of the operation of the preferred embodiment of the invention which in this case is an apparatus 10 for installation in an aircraft to detect wind vector difference and clear air turbulence. Although the preferred embodiment of the invention is described in terms of its application to aircraft, the invention can have other applications some of which are described below. Installed in a forward, and partially sideways, looking location of the aircraft, such as the nose or a leading portion of a wing is a passive detector 12, preferably a radiometer for receiving infrared radiation from the atmosphere as indicated by a dashed line 14. Also, as indicated by a block 16, the radiometer 12 is connected to a directional scanning mechanism which permits the radiometer 12 to receive the radiation 14 from different directions in both the azimuth and vertical directions or in only the azimuth direction.

Shown at block 18, the apparatus 10 will convert the sterance or energy L at a particular wave length $\lambda$ of the radiation 14 as detected by the radiometer 12 into a value $T_{eff}$ which represents the temperature of the atmosphere at an effective range $R_{eff}$ from the aircraft. The concept of converting the radiation 14 into temperature $T_{eff}$ and the effective range $R_{eff}$ will be described below.

Figure 2:
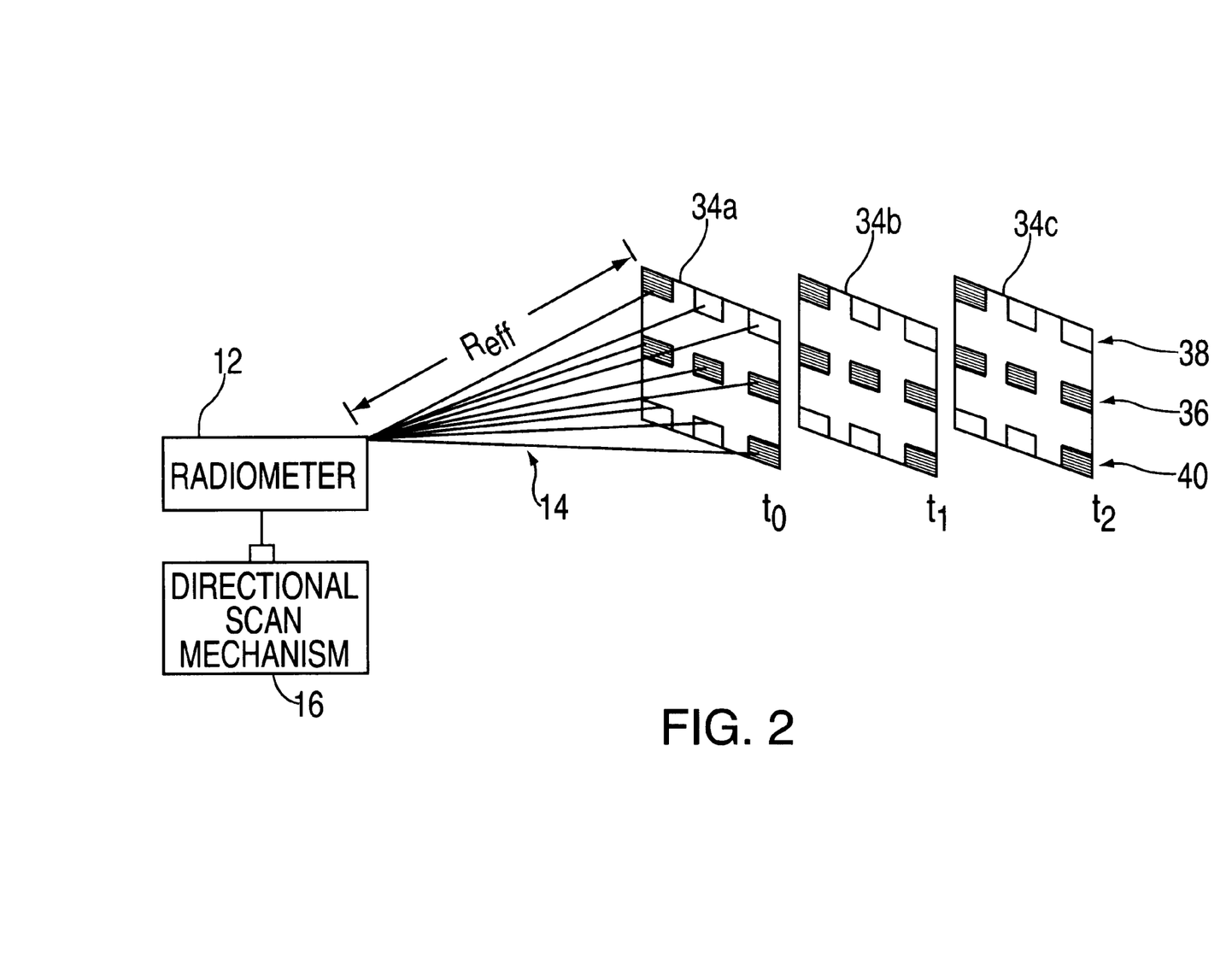
FIG. 2 is pictorial representation of a scanning array illustrating the operation of a radiometer in the invention of FIG. 1 at three time intervals.

Then, as indicated at a block 20, the $T_{eff}$ values obtained will be used to create a horizontal or vertical temperature map of atmospheric temperature ahead of the aircraft as illustrated in FIGS. 2–7. As the aircraft progresses along its line of flight, the system data is collected as shown in FIG. 2. The apparatus then generates a temperature map as indicated at 20.

The temperature mapping 20 is used to compute horizontal temperature gradients $\nabla T$, indicated at a block 22, between the temperatures T, contained in the map 20 in a horizontal plane.

As represented by a block 24 and discussed below, the horizontal temperature gradients $\nabla T$ can be used to compute vertical wind vector difference for flight levels ahead as well as above and below the aircraft.

Effective use of the wind vector difference information generated at 24 can be made, as shown at a block 26, by displaying the wind vector difference at flight levels above or below the aircraft in order to provide the air crew with information as to winds that might be more favorable. This information 24 can also be used as an input to a flight management system, indicated by a block 28, so that it can be combined with other flight parameters to provide guidance as to the most efficient flight regime. In addition, this information 24 can be used to compute the probability of clear air turbulence, as indicated by a block 30 that in turn can be used as an input to a clear air turbulence display or warning system as shown by a lock 32.

The following is a more detailed description of the various elements and concepts of the invention as shown in the block diagram of FIG. 1.

For example, FIG. 2 provides an illustration of the operation of the radiometer 12 in conjunction with the directional scan mechanism 16. In this case the scan mechanism 16 directs the radiometer 12 so as to receive radiation 14 from what in effect are 3×3 arrays 34a, 34b and 34c of points in the atmosphere ahead of the aircraft collecting sterance associated with an effective range $R_{eff}$ at time intervals $t_0$, $t_1$ and $t_2$. In the preferred embodiment of the invention, a middle row 36 of the arrays 34a–c is located at the aircraft's flight level while an upper row 38 is located at a level intermediate between the flight level and an upper flight level and a lower row 40 is located at a level intermediate between the flight level and a lower flight level. An illustration of the flight levels is provided in FIG. 7. The radiometer 12 can be any suitable commercially available radiometer or a radiometer of the type described in the above referenced patents such as U.S. Pat. No. 4,937,447 to Barrett which is hereby incorporated by reference. In another preferred embodiment, only one horizontal temperature map at one level is used for determining wind difference.

Figure 3:
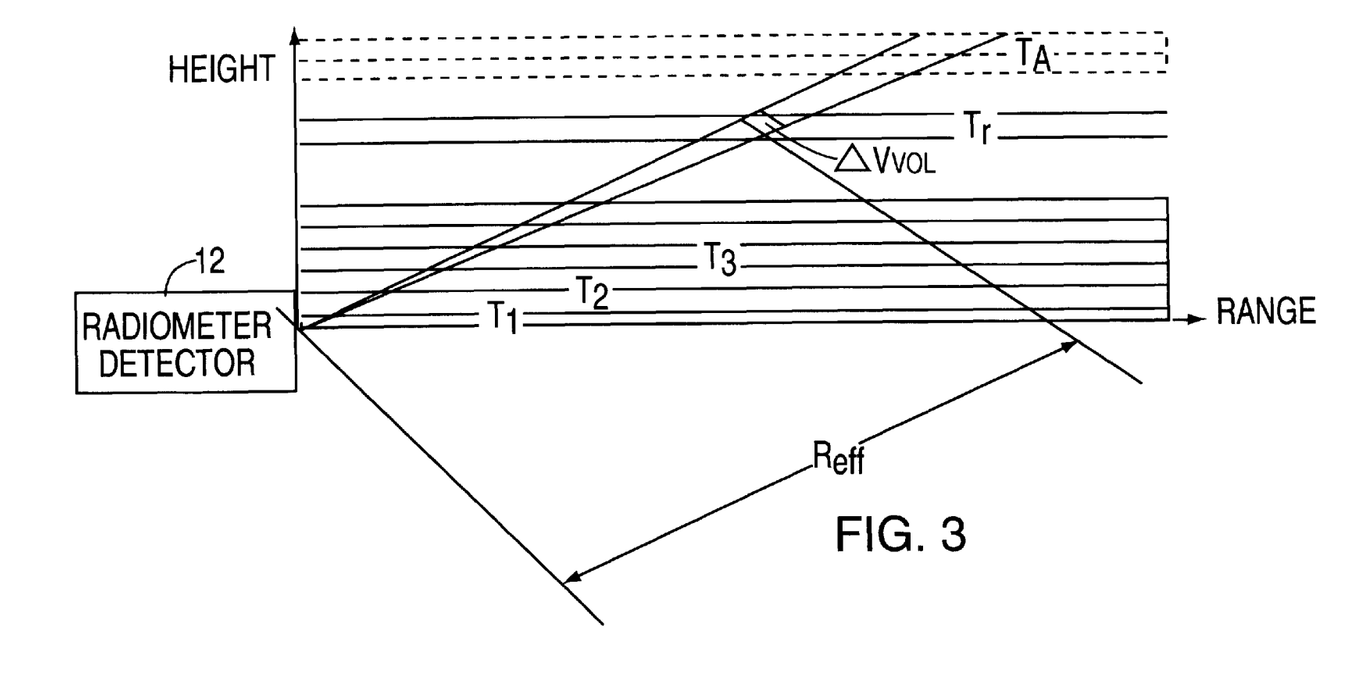
FIG. 3 is a pictorial representation of a section of the atmosphere illustrating the operation of the radiometer of FIG. 1.

Referring also to FIG. 1 and FIG. 3, the temperature conversion 18 of each point in the arrays 34a–c is accomplished by translating the radiance $L(\lambda)$ received by the radiometer 12, where the wavelength is $\lambda$, into a signal that is associated with a temperature $T_{eff}$ of the volume of air seen by the radiometer. The temperature, $T_{eff}$, is associated with the effective range, $R_{eff}$, which is the weighted average distance of the signal reaching the radiometer 12. This use of $R_{eff}$ is only useful in conditions for which $R_{eff}$ does not vary significantly during aircraft flight across reasonable distances at a fixed altitude. It has been found that $R_{eff}$ does not vary significantly for normal flight conditions, i.e., $R_{eff}$ is determined by only the wavelength $\lambda$, the altitude and latitude of the aircraft and the particular time of year. This has been verified through the use of the FASCODE program. The FASCODE program is a computer model of atmospheric transmission and radiance in the infrared. This program is described and identified in the aforementioned Barrett, U.S. Pat. No. 4,937,447. The following Table 1 is a table illustrating the FASCODE (using the mid-latitude, winter atmosphere program) computed effective range $R_{eff}$ vs. $\lambda$ in the case that $\lambda$ falls within the preferred band of wavelengths of $CO_2$ emission for a zenith angle of 90 degrees and an altitude of 35,000 ft.

TABLE 1

| Wavelength ($\mu$m) | Effective Range (km) |
|---|---|
| 12.2 | 121 |
| 12.3 | 106 |
| 12.4 | 98.2 |
| 12.5 | 84.4 |
| 12.6 | 76.6 |
| 12.7 | 91.8 |
| 12.8 | 105 |
| 12.9 | 106 |
| 13.0 | 89.3 |

It has been found that the wavelength 12.2 $\mu$m of $CO_2$ is particularly effective at measuring $T_{eff}$ associated with a range $R_{eff}$ of approximately 120 km for one altitude and latitude. It should be noted that one of the advantages of the invention is that it makes use of previously computed values of $R_{eff}$ so that it is possible to provide accurate maps of atmospheric temperature. Also it is possible to store tables of $R_{eff}$ vs. Altitude and $\lambda$ vs. $R_{eff}$ such as shown in the Table 1 above in order to adjust the sensitivity of the system and the effective range for various conditions. Alternatively, it is possible to use more than one wavelength $\lambda$ to measure more than one $T_{eff}$ at corresponding ranges $R_{eff}$ from the aircraft.

The radiance $L(\lambda)$ detected by the radiometer 12 is a function of the temperature of the naturally occurring $CO_2$ in the atmosphere. It is possible to associate the temperature of the air in $\Delta V_{vol}$ shown in FIG. 3 with a given signal. The total signal, $L(\lambda)$, is the sum of the contributions, $L(\lambda)_i$ of signal from each volume element i along the line of sight of the radiometer 12. Thus $$L(\lambda) = \sum_i L(\lambda)_i = \sum_i S_i \tau_i \qquad (1)$$

where $S_i$ is the radiance intercepted by the detector from a volume element i and $\tau_i$ is the transmission of the radiance between the volume element i and the detector. The temperature $T_{eff}$ is associated with $L(\lambda)$, where $T_{eff}$ is the temperature of a blackbody source which produces the same radiometer signal as $L(\lambda)$. The effective distance $R_{eff}$ is defined according to the equation $$R_{eff} = \frac{\sum_i R_i L(\lambda)_i}{\sum_i L(\lambda)_i} \qquad (2)$$

As indicated at 18 of FIG. 1, the temperature $T_{eff}$ is associated with $R_{eff}$ and a map is generated at 20 with the temperature $T_{eff}$ at a distance $R_{eff}$ in the appropriate direction from the aircraft. For normal flight conditions, $R_{eff}$ does not vary significantly and is determined only by altitude and latitude for a given time of year. With respect to FIG. 3, the altitude of $\Delta V_{vol}$ for a $R_{eff}$ of 120 km will be about 1000 ft. above the flight level of the aircraft due to the earth's curvature assuming the radiometer 12 is directed toward the horizon.

Figure 4:
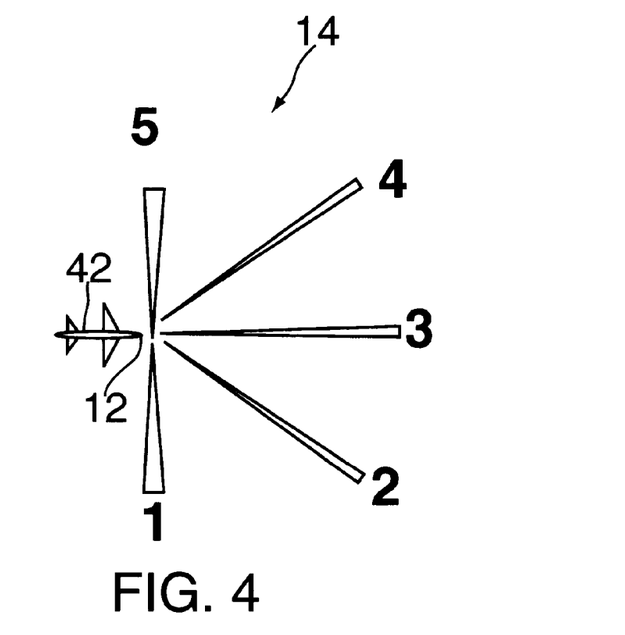
FIG. 4 is a pictorial representation of an aircraft operating the radiometer of FIG. 1 in a horizontal scan mode.
Figure 5:
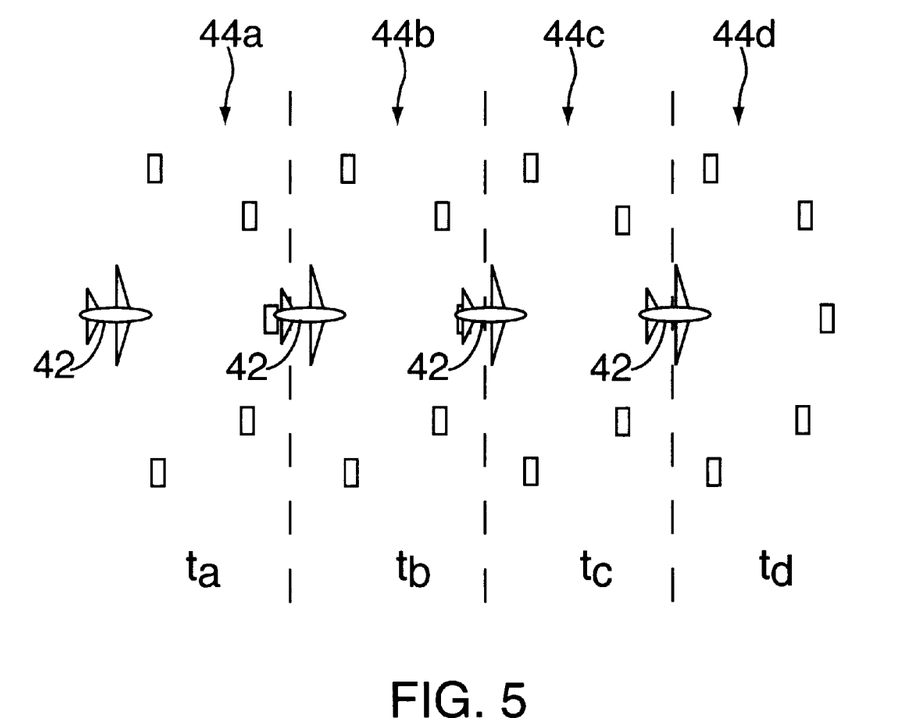
FIG. 5 is a pictorial representation of an aircraft acquiring a horizontal temperature map according to the invention of FIG. 1.
Figure 6:
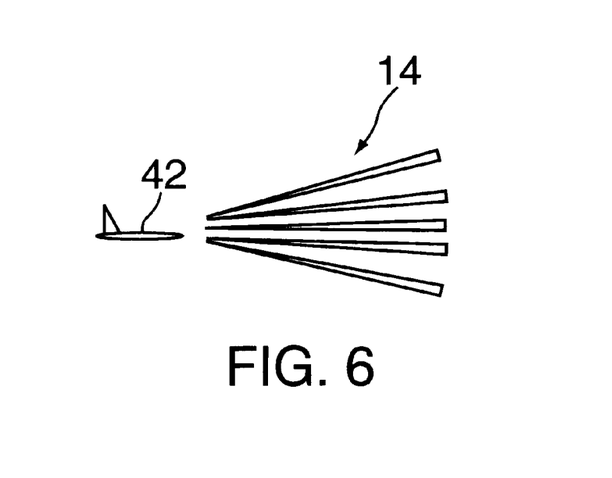
FIG. 6 is a pictorial representation of an aircraft operating the radiometer of FIG. 1 in a vertical scan mode.

FIGS. 4–6, illustrate how the temperature mapping 20 can be accomplished. In FIG. 4, an aircraft 42 having the radiometer 12 mounted in its nose causes the radiometer 12 to perform an azimuth scan of 180°. At each of the five positions shown in FIG. 4, the radiometer 12 will detect the radiance 14. In this manner a horizontal temperature map is generated. The radiometer can detect signals sufficiently fast that the motion of the aircraft can be ignored. FIG. 5 shows a series of locations indicated by a set of rectangular boxes $44_{a-d}$ that correspond to a set of time intervals $t_{a-d}$ as the aircraft 42 proceeds along its flight path, where the temperatures $T_{eff}$ detected for each location $44_{a-d}$ can be stored in memory. Similarly, as illustrated in FIG. 6, the radiometer 12 in the aircraft 42 can perform a vertical scan so that temperatures of locations above and below the flight path can be mapped. As a result, it is possible to generate temperature maps for horizontal planes above and below the aircraft 42.

By mapping the temperature fields 20 as described above, it is possible to compute horizontal temperature gradients $\nabla T$ as indicated at 22 of FIG. 1. It is also possible, by using the vertical temperature mapping to calculate the temperature lapse rate $\partial T/\partial z$ for use in calculation of the Richardson Number for computing the probability of clear air turbulence.

Figure 7:
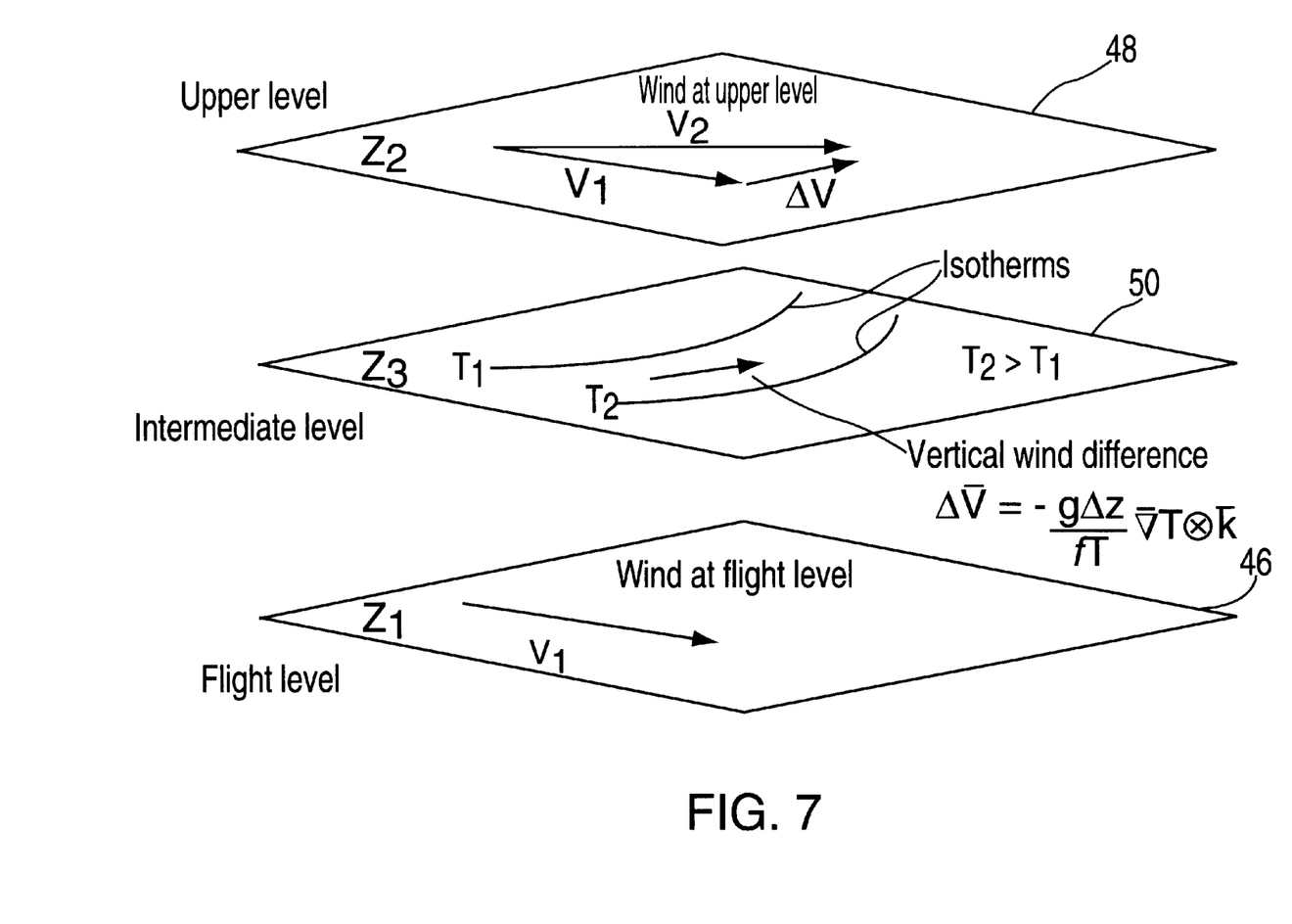
FIG. 7 is a pictorial representation of the determination of the direction and velocity of wind at a level above the flight level of the aircraft according to the invention.

As illustrated by the representation of FIG. 7, one of the salient features of the invention is the capability of utilizing the temperature gradients computed at 22 to generate values representing vertical wind vector difference or horizontal winds at various flight levels. In this case, only a horizontal mapping at one level is needed. For example, a method according to the invention whereby the thermal wind concepts can be used to compute vertical wind vector difference, $\Delta V$, as indicated at 24 of FIG. 1, makes use of the following relation:

$$\Delta V = -\left[\frac{g \Delta z}{fT}\right] \nabla T \otimes k \quad (3)$$

where g is the acceleration due to gravity, $\Delta z$ is the distance between $Z_1$ and $Z_2$, f is the Coriolis parameter resulting from the earth's rotation, T is the temperature at said flight altitude $Z_1$, $\nabla T$ is the vector representing the temperature gradient at the intermediate level $Z_3$ between $Z_1$ and $Z_2$, k is the unit vector parallel to the aircraft's local vertical and the symbol $\hat{\times}$ represents the vector cross-product operator. In FIG. 7, $Z_1$ denotes the current flight level of the aircraft, $Z_2$ denotes the flight level above the aircraft and $Z_3$ denotes the intermediate level. Equation 3 may be found in any standard meteorological text such as Dynamical and Physical Meteorology by G. J. Haltiner and F. L. Martin, (McGraw-Hill, New York, 1957) p.204.

As a result, once the temperature gradients are computed 22 from the temperature field 20 the value of $\Delta V$ can be computed at 24 for the upper flight level 48 per equation (3). For an aircraft direction vector, $V_{ac}$, the vector dot product, $\Delta V \bullet V_{ac}$, is the increase in headwind or tailwind the aircraft would experience at the different altitude. In addition, the vector value $\Delta V$ can then be added to the vector value $V_1$ of the wind at the current flight level 46 to obtain a vector value $V_2$ which represents the direction and speed of the wind at the upper flight level 48. This value then can also be displayed on the display 26 in order to provide the air crew with information as to the wind at the upper flight level 48. Alternatively, the display 26 can be used to display just the difference in wind speed along the direction of the aircraft's flight at the upper flight level 48, for example by displaying a simple plus or minus sign along with a value representing the difference in velocity. In addition, the value of $V_2$ can be used as an input to the flight management system 28 so that factor can be used by the system 28 in determining the most efficient flight regime. Note that the temperatures are only needed in one horizontal plane to determine $\nabla T$, and the wind difference, $\Delta V$.

It will be understood that the above discussed method of determining wind direction and velocity $V_2$ at the upper flight level 48 would also apply to the determination of wind at a lower flight level below the current flight level 46. In this manner, it is possible to provide on the display 26 or to the flight management system 28 an indication of the winds both above and below the aircraft so that the crew can take advantage of this information in selecting the most fuel efficient altitude.

Another feature of the invention relates to the use of the temperature mapping function 20 along with the computation of vertical temperature gradients 22 to compute the probability of clear air turbulence 30. In particular, the vertical temperature mapping 20 can be used to calculate the lapse rate $\partial T/\partial z$ for determination of the Richardson number Ri which is correlated with turbulent conditions. In this case Ri is computed using the following relations:

$$Ri = \left(\frac{g}{\theta}\right) \frac{\left(\frac{\partial \theta}{\partial z}\right)}{\left|\frac{\partial V}{\partial z}\right|^2} \text{ where} \quad (4)$$

$$\theta = T\left\{\frac{1000}{p}\right\}^{\frac{R}{C_p}} \quad (5)$$

and where $\theta$ is the potential temperature, $\partial \theta/\partial z$ is the vertical gradient of the potential temperature, $\partial V/\partial z$ is the vertical wind shear, g is acceleration due to gravity, V is the horizontal wind vector, z is height, T is temperature in Kelvin, p is atmospheric pressure in millibars, R is the universal gas constant and $C_p$ is the specific heat of air at constant pressure. The Richardson number, Ri, is a measure of the probability of CAT. For Ri below 0.21, atmospheric turbulence occurs and CAT is likely. Severity of CAT increases with decreasing Ri. Referring again to FIG. 1, the probability of clear air turbulence is determined at 30 with the result displayed on the CAT display 32.

The embodiment of the invention in FIG. 1 has been described in terms of its use in connection with an aircraft traversing temperature fields in its flight path. However, this type of apparatus can also adapted for use in mapping temperature fields from a fixed geographical position. By using the radiometer 12 at a fixed site to scan temperature at the effective range $R_{eff}$ as described above over a period of time as the weather moves over the radiometer, it is possible to generate a map of the temperature fields for a wide area. The temperature map can then be used for warnings of wind conditions such as clear air turbulence and dry microburst conditions. Another use at a fixed position is to scan the temperature field in 360° azimuth and in elevation to determine wind differences, or CAT at one time.

We claim:

1. An apparatus for determining the wind vector difference, $\Delta V$, between a first altitude $Z_1$ and a second altitude $Z_2$, comprising:

a) temperature measurement means for measuring a plurality of temperatures T at an altitude $Z_3$;

b) means, responsive to the temperature measurement means, for calculating $\nabla T$, the vector temperature gradient, over the altitude $Z_3$; and c) wind vector difference computational means, responsive to the means for calculating the vector temperature gradient, for determining $\Delta V/\Delta z$, the wind vector difference, where $\Delta z$ is the vertical distance between altitudes $Z_1$ and $Z_2$.

2. The apparatus of claim 1 where the altitude $Z_3$ is within about 6000 feet of the altitudes $Z_1$ and $Z_2$.

3. The apparatus of claim 1 where the altitude $Z_3$ is preferably between the altitudes $Z_1$ and $Z_2$.

4. The apparatus of claim 1 further comprising:

means, responsive to the temperature measurement means, for generating a map of the plurality of temperatures at the altitude $Z_3$;

means for deriving lines of constant temperature from the map; and means, responsive to the lines of constant temperature, for calculating the vector temperature gradient $\nabla T$.

5. The apparatus of claim 1 where the means for calculating the vector temperature gradient $\nabla T$ comprises means for calculating a vector isobaric temperature gradient and the wind vector difference computational means comprises means for determining $\Delta V$ according to the equation $$\Delta V = -\left[\frac{g\Delta z}{fT}\right]\nabla T \otimes k$$

where f is the Coriolis parameter resulting from the Earth's rotation, T is the temperature at altitude $Z_3$ and k is the unit vector parallel to the local vertical.

6. The apparatus of claim 1 further comprising means for displaying a representation of $\Delta V$.

7. An apparatus for determining the wind vector difference, $\Delta V$, between a first altitude $Z_1$ and a second altitude $Z_2$, comprising:

temperature measurement means, secured to a platform, for measuring a plurality of temperatures at a constant altitude $Z_3$ between the first altitude $Z_1$ and the second altitude $Z_2$;

means, responsive to the means for measuring temperature, for calculating $\nabla T$, the vector temperature gradient, at altitude $Z_3$; and wind vector difference computation means, responsive to the vector temperature gradient, $\nabla T$, for generating a signal, $\Delta V/\Delta z$ where $\Delta z$ is the vertical distance between the altitude $Z_1$ and altitude $Z_2$.

8. The apparatus of claim 7 where the platform is an aircraft.

9. The apparatus of claim 7 where the platform is fixed to the ground.

10. The apparatus of claim 7 where the temperature measurement means comprises detector means for measuring the plurality of temperatures.

11. The apparatus of claim 7 where the temperature measurement means comprises a passive infrared detector for generating the plurality of temperature signals.

12. The apparatus of claim 7 where the temperature measurement means comprises:

means for generating a plurality of temperature values representing a plurality of temperatures of the atmosphere at the altitude $Z_3$ at a predetermined range from the detector; and means for generating the vector temperature gradient $\nabla T$ from the plurality of temperature values.

13. An apparatus for determining wind profile data for use in an aircraft flight management system based on the prediction of the wind vector difference, $\Delta V$, between an aircraft flight altitude $Z_1$ and a second altitude $Z_2$ comprising:

horizontal and vertical temperature measurement means, located on the aircraft, for generating a map of temperatures T at constant altitude $Z_3$ between the first and second altitudes $Z_1$ and $Z_2$;

calculation means for calculating $\nabla T$, the vector temperature gradient, at the altitude $Z_3$; and wind vector difference computation means, responsive to the vector temperature gradient, $\nabla T$, for generating a signal, $\Delta V/\Delta z$ where $\Delta z$ is the vertical distance between the flight altitude $Z_1$ and the altitude $Z_2$.

14. The apparatus of claim 13 where the altitude $Z_3$ is within about 6000 feet of the altitudes $Z_1$ and $Z_2$.

15. The apparatus of claim 13 where the temperature measurement means comprises means for determining the temperatures in the map at an effective range $R_{eff}$ from the aircraft.

16. The apparatus of claim 13, further comprising:

means for deriving lines of constant temperature from the map; and means, responsive to the lines of constant temperature, for calculating the vector temperature gradient $\nabla T$.

17. The apparatus of claim 13 where the vector temperature gradient $\nabla T$ represents a vector isobaric temperature gradient and the wind vector difference computation means generates the $\Delta V$ signal according to the relation $$\Delta V = -\left[\frac{g\Delta z}{fT}\right]\nabla T \otimes k$$

where g is the acceleration due to gravity, f is the Coriolis parameter resulting from the earth's rotation, T is the temperature at the flight altitude $Z_3$ and k is the unit vector parallel to the aircraft's local vertical.

18. The apparatus of claim 13 further comprising display means for displaying a representation of $\Delta V$.

19. The apparatus of claim 13 further comprising means for providing $\Delta V$ to the flight management system.

20. The apparatus of claim 13 further comprising means for determining clear air turbulence conditions ahead of an aircraft based on the prediction of the Richardson number, the means for determining clear air turbulence comprising:

means for determining $\partial\theta/\partial z$, the vertical gradient of the potential temperature, where $\theta$ is atmospheric temperature and z represents a vertical distance ahead of the aircraft;

means for determining $\partial V/\partial z$, the vertical wind shear, where V is the horizontal wind vector; and means for calculating the Richardson number, Ri, from the equation $$Ri = \left(\frac{g}{\theta}\right)\frac{\left(\frac{\partial\theta}{\partial z}\right)}{\left|\frac{\partial V}{\partial z}\right|^2}$$

21. The apparatus of claim 20 where the means for determining clear air turbulence further comprises means for determining the probability of clear air turbulence.

22. The apparatus of claim 1 where the temperature measurement means comprises:

detector means for detecting radiation $L(\lambda)$ having a wavelength $\lambda$ from a predetermined direction; and computational means, responsive to the detector means, for computing a value $T_{eff}$ representing the temperature of the atmosphere at an effective range $R_{eff}$ from the detector means.

23. The apparatus of claim 22 where the detector means comprises a passive infrared detector for detecting the radiation $L(\lambda)$.

24. The apparatus of claim 23 where the radiation $L(\lambda)$ corresponds to the energy resulting from the emission of atmospheric $CO_2$ at the wavelength $\lambda$ from the portion of the atmosphere at the effective range $R_{eff}$.

25. The apparatus of claim 24 where the wavelength $\lambda$ is between 12.2 $\mu$m and 13.0 $\mu$m.

26. The apparatus of claim 25 where the wavelength $\lambda$ is 12.3 $\mu$m.

27. The apparatus of claim 22 where the effective range $R_{eff}$ is approximately 120 km.

28. The apparatus of claim 22 further comprising mapping means, responsive to the computational means, for mapping the temperatures $T_{eff}$ along the predetermined direction.

29. The apparatus of claim 28 where the mapping means comprises means for generating the values $T_{eff}$ at predetermined time intervals.

30. The apparatus of claim 28 where the mapping means comprises scanning means for varying the predetermined direction; and means for generating a planar temperature map.

31. The apparatus of claim 30 where the scanning means comprises means for varying the predetermined direction vertically and the apparatus further comprises means for generating the temperature map for a plurality of altitudes.

32. The apparatus of claim 30 where the scanning means is geographically fixed and the temperature map represents isotherms at a predetermined altitude.

33. The apparatus of claim 32 where the predetermined altitude is a function of $R_{eff}$.

34. The apparatus of claim 30 where the scanning means is secured to an aircraft and comprises means for setting the predetermined direction in the azimuth plane.

35. The apparatus of claim 34 where the scanning means comprises means for varying the predetermined direction vertically and the apparatus further comprises means for generating a plurality of horizontal temperature maps for a plurality of altitudes.

36. The apparatus of claim 22 where the wavelength $\lambda$ is between 12.2 $\mu$m and 13 $\mu$m;

the detector means comprises an infrared radiometer and scanning means for scanning the radiometer in the vertical and horizontal directions; and the mapping means comprises means for generating horizontal and vertical temperature maps.

37. A method for determining the wind vector difference, $\Delta V$, between a first altitude $Z_1$ and a second altitude $Z_2$, comprising the steps of:

a) measuring a plurality of temperatures T at an altitude $Z_3$;

b) in response to the step of measuring temperature, calculating $\nabla T$, the vector temperature gradient, over the altitude $Z_3$; and c) in response to calculating the vector temperature gradient, determining $\Delta V/\Delta z$, the wind vector difference, where $\Delta z$ is the vertical distance between altitudes $Z_1$ and $Z_2$.

38. The method of claim 37 where the altitude $Z_3$ is within about 6000 feet of the altitudes $Z_1$ and $Z_2$.

39. The method of claim 37 where the altitude $Z_3$ is preferably between the altitudes $Z_1$ and $Z_2$.

40. The method of claim 37, further comprising the steps of:

in response to step of measuring temperature, generating a map of the plurality of temperatures at the altitude $Z_3$;

deriving lines of constant temperature from the map; and in response to the lines of constant temperature, calculating the vector temperature gradient $\nabla T$.

41. The method of claim 37 where the step of calculating the vector temperature gradient $\nabla T$ comprises the step of calculating a vector isobaric temperature gradient and the step of calculating the wind vector difference comprises the step of determining $\Delta V$ according to the equation $$\Delta V = -\left[\frac{g\Delta z}{fT}\right]\nabla T \otimes k$$

where f is the Coriolis parameter resulting from the Earth's rotation, T is the temperature at altitude $Z_3$ and k is the unit vector parallel to the local vertical.

42. The method of claim 37 further comprising the step of displaying a representation of $\Delta V$.

43. An method for determining the wind vector difference, $\Delta V$, between a first altitude $Z_1$ and a second altitude $Z_2$, comprising the steps of:

measuring a plurality of temperatures at a constant altitude $Z_3$ between the first altitude $Z_1$ and the second altitude $Z_2$;

in response to the step of measuring temperature, calculating $\nabla T$, the vector temperature gradient, at altitude $Z_3$; and in response to the step of calculating vector temperature gradient, $\nabla T$, generating a signal, $\Delta V/\Delta z$ where $\Delta z$ is the vertical distance between the altitude $Z_1$ and altitude $Z_2$.

44. The method of claim 43 where the steps are performed on an aircraft.

45. The method of claim 43 where the steps are performed on the ground.

46. The method of claim 43 where the step of measuring the plurality of temperatures comprises the steps of:

generating a plurality of temperature values representing a plurality of temperatures of the atmosphere at the altitude $Z_3$ at a predetermined range from the detector; and generating the vector temperature gradient $\nabla T$ from the plurality of temperature values.

47. A method for determining wind profile data for use in an aircraft flight management system based on the prediction of the wind vector difference, $\Delta V$, between an aircraft flight altitude $Z_1$ and a second altitude $Z_2$ comprising:

measuring temperature in the horizontal and vertical planes;

generating a map of temperatures T at constant altitude $Z_3$ between the first and second altitudes $Z_1$ and $Z_2$;

calculating the vector temperature gradient, $\nabla T$, at the altitude $Z_3$; and in response to the step of calculating the vector temperature gradient, generating a signal, $\Delta V/\Delta z$ where $\Delta z$ is the vertical distance between the flight altitude $Z_1$ and the altitude $Z_2$.

48. The method of claim 47 where the altitude $Z_3$ is within about 6000 feet of the altitudes $Z_1$ and $Z_2$.

49. The method of claim 47 where the step of measuring temperature comprises the step of determining the temperatures in the map at an effective range $R_{eff}$ from the aircraft.

50. The method of claim 47, further comprising the steps of:
   deriving lines of constant temperature from the map; and
   in response to the lines of constant temperature, calculating the vector temperature gradient $\nabla T$.

51. The method of claim 47 where the $\nabla T$ represents a vector isobaric temperature gradient and further comprising the step of generating the $\Delta V$ signal according to the relation $$\Delta V = -\left[\frac{g\Delta z}{fT}\right]\nabla T \otimes k$$

where g is the acceleration due to gravity, f is the Coriolis parameter resulting from the earth's rotation, T is the temperature at the flight altitude $Z_3$ and k is the unit vector parallel to the aircraft's local vertical.

52. The method of claim 47 further comprising the step of displaying a representation of $\Delta V$.

53. The method of claim 47 further comprising the step of providing $\Delta V$ to the flight management system.

54. An apparatus for determining the wind vector difference, $\Delta V$, between a first altitude $Z_1$ and a second altitude $Z_2$, comprising:
   a) temperature measurement means for measuring a plurality of temperatures at altitude $Z_1$;
   b) means, responsive to the temperature measurement means, for calculating T, the vector temperature gradient over the altitude $Z_1$; and
   c) wind different computational means, responsive to the means for calculating the vector temperature gradient, for determining $\Delta V/\Delta z$, the wind vector difference, where $\Delta z$ is the vertical different between altitudes $Z_1$ and $Z_2$.

55. An apparatus for determining wind profile data for use in an aircraft flight management system based on the prediction of the wind difference, $\Delta V$, between an aircraft flight altitude $Z_1$ and a second altitude $Z_2$ comprising:
   horizontal and vertical temperature measurement means, located on the aircraft, for generating a map of temperatures T at constant altitude $Z_1$;
   calculation means for calculating $\nabla T$, the vector temperature gradient, at the altitude $Z_1$; and
   wind vector difference computation means, responsive to the vector temperature gradient, $\nabla T$, for generating a signal, $\Delta V/\Delta z$ where $\Delta z$ is the vertical distance between the flight altitude $Z_1$ and the altitude $Z_2$.

56. A method for determining the wind vector difference, $\Delta V$, between a first altitude $Z_1$ and a second altitude $Z_2$, comprising the steps of:
   a) measuring a plurality of temperatures T at altitude $Z_1$;
   b) in response to the step of measuring temperature, calculating $\nabla T$, the vector temperature gradient, over the altitude $Z_1$; and
   c) in response to calculating the vector temperature gradient, determining $\Delta V/\Delta z$, the wind vector difference, where $\Delta z$ is the vertical distance between altitudes $Z_1$ and $Z_2$.

57. Method for determining wind profile data for use in an aircraft flight management system based on the prediction of the wind vector difference, $\Delta V$, between an aircraft flight altitude $Z_1$ and a second altitude $Z_2$ comprising:
   measuring temperature in the horizontal and vertical planes;
   generating a map of temperatures T at constant altitude $Z_1$;
   calculating the vector temperature gradient, $\nabla T$, at the altitude $Z_1$; and
   in response to, the step of calculating the vector temperature gradient, generating a signal, $\Delta V/\Delta z$ where $\Delta z$ is the vertical distance between the flight altitude $Z_1$ and the altitude $Z_2$.

* * * * *

UNITED STATES PATENT AND TRADEMARK OFFICE
CERTIFICATE OF CORRECTION

PATENT NO. : 6,070,460
DATED : June 6, 2000
INVENTOR(S) : Leslie Kenrick et al.

It is certified that error appears in the above-identified patent and that said Letters Patent is hereby corrected as shown below:

Column 14,
Line 41, claims 57 & 58 should be added:

-- 57. An apparatus for determining the wind vector difference, $\Delta V$, between a first altitude $Z_1$ and a second altitude $Z_2$ comprising:

temperature measurement means for measuring a plurality of temperatures at an altitude $Z_3$ and means for calculating the vector temperature gradient, $\nabla T$, over said altitude $Z_3$ comprising:

detector means for detecting radiation $L(\lambda)$ having a wavelength $\lambda$ from a predetermined direction; and         computational means, responsive to said detector means, for computing a value $T_{eff}$ representing the temperature of the atmosphere at an effective range $R_{eff}$ from said detector means; and     wind vector difference computation means for generating a signal $\Delta V/\Delta z$ where $\Delta V$ represents the wind vector difference between said altitudes $Z_1$ and $Z_2$ and $\Delta z$ is the vertical distance between the altitude $Z_1$ and said altitude $Z_2$ according to the relation $$\Delta V = -\left[\frac{g\Delta z}{fT}\right]\nabla T \otimes k$$

where g is the acceleration due to gravity, f is the Coriolis parameter resulting from the earth's rotation, T is the temperature at an altitude $Z_4$, $\nabla T$ is the vector representing the temperature gradient at the intermediate level between $Z_1$ and $Z_2$, k is the unit vector parallel to the local vertical and the symbol $\otimes$ represents the vector cross-product operator.

71. An apparatus for determining wind profile data for use in an aircraft flight management system based on the prediction of the wind vector difference, $\Delta V$, between an aircraft flight altitude $Z_1$ and a second altitude $Z_2$ comprising:

horizontal and vertical temperature measurement means located on the aircraft, for generating a map of temperatures at constant altitude $Z_3$ between said first and second altitudes $Z_1$ and $Z_2$ comprising:

detector means for detecting radiation $L(\lambda)$ having a wavelength $\lambda$ from a predetermined direction; and

UNITED STATES PATENT AND TRADEMARK OFFICE
CERTIFICATE OF CORRECTION

PATENT NO. : 6,070,460
DATED : June 6, 2000
INVENTOR(S) : Leslie Kenrick et al.

It is certified that error appears in the above-identified patent and that said Letters Patent is hereby corrected as shown below:

computational means, responsive to said detector means, for computing a value $T_{eff}$ representing the temperature of the atmosphere at an effective range $R_{eff}$ from said detector means; and calculation means for calculating the vector temperature gradient, $\nabla T$, at said altitude $Z_3$;

wind vector difference computation means, responsive to said $\nabla T$ for generating a signal, $\Delta V/\Delta z$ where $\Delta V$ represents the wind vector difference between said altitudes $Z_1$ and $Z_2$ and $\Delta z$ is the vertical distance between the flight altitude $Z_1$ and said altitude $Z_2$ according to the relation $$\Delta V = -\left[\frac{g\Delta z}{fT}\right]\nabla T \otimes k$$

where g is the acceleration due to gravity, f is the Coriolis parameter resulting from the earth's rotation, T is the temperature at said flight altitude $Z_1$, $\nabla T$ is the vector representing the temperature gradient at the intermediate level between $Z_1$ and $Z_2$, k is the unit vector parallel to the aircraft's local vertical and the symbol $\otimes$ represents the vector cross-product operator. --

Signed and Sealed this

Sixteenth Day of April, 2002

*Attest:*

*Attesting Officer*

JAMES E. ROGAN
*Director of the United States Patent and Trademark Office*